Sept. 4, 1934.  A. Y. DODGE ET AL  1,972,132
LUBRICATING DEVICE
Filed July 30, 1932
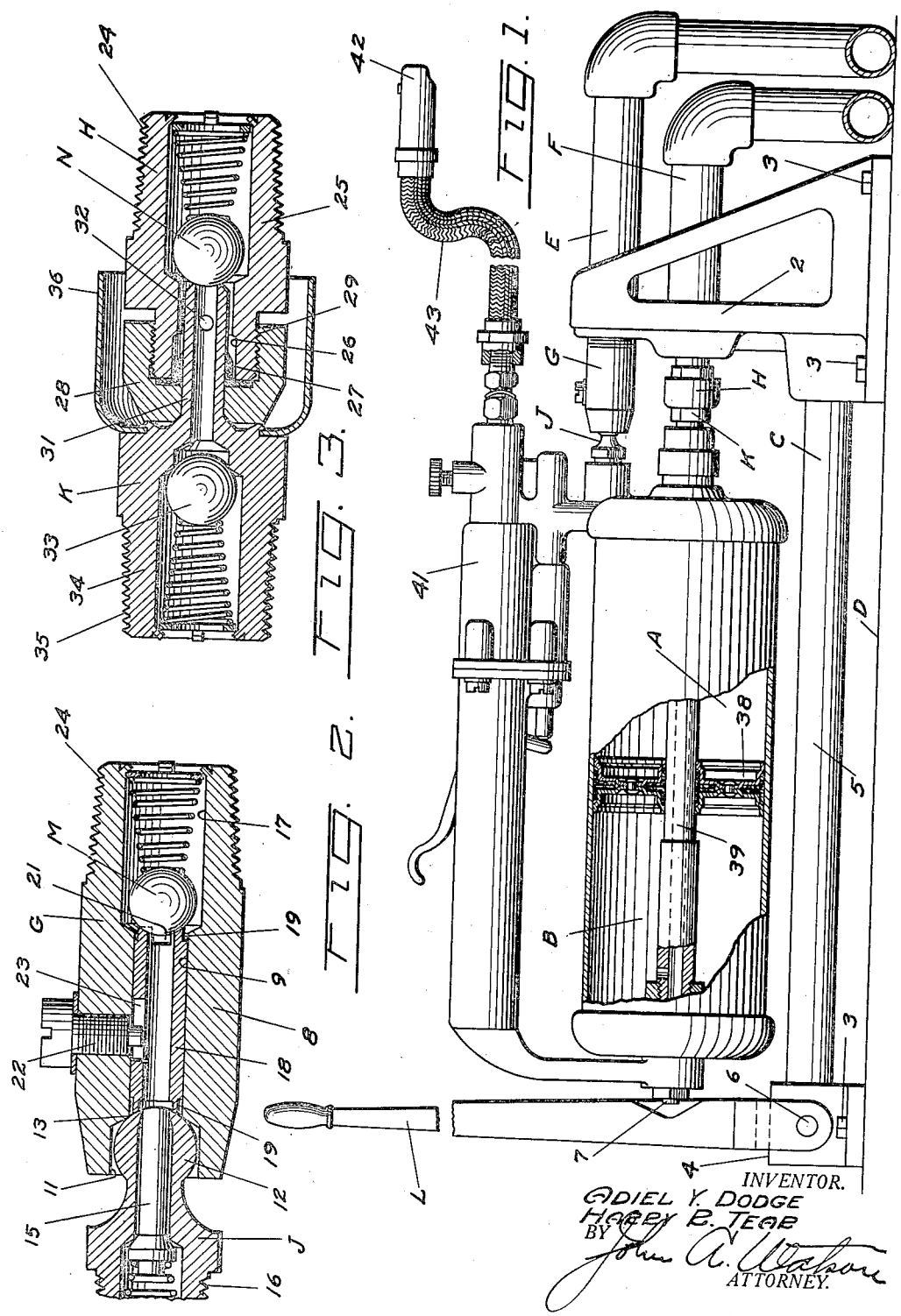
INVENTOR.
ADIEL Y. DODGE
HARRY E. TEAR
BY
ATTORNEY.

Patented Sept. 4, 1934

1,972,132

UNITED STATES PATENT OFFICE 1,972,132

LUBRICATING DEVICE

Adiel Y. Dodge and Harry R. Tear, South Bend, Ind., assignors to The Lubrication Corporation, South Bend, Ind., a corporation of Delaware Application July 30, 1932, Serial No. 626,272

10 Claims. (Cl. 221—47.5)

This invention relates to improvements in lubricating devices and more particularly to charging apparatus for lubricant guns and the like.

Heretofore it has been the practice to fill the reservoir of lubricant guns and compressors with lubricants by transferring the lubricant from a container to the reservoir in scoops or upon paddles or through the use of small gear or hand pumps through a spout into an opening in the reservoir. These methods, however, result in loss of time as well as the smearing of the operator's hands and adjacent parts of the gun with lubricant and are, therefore, generally undesirable.

An object of the invention is to provide a charging device wherein the lubricant gun may be automatically charged by placing the gun in a predetermined position upon the charging device and moving a hand lever to first effect a seal between the gun and charging nozzle and thereafter open the valve of the nozzle.

A further object is to provide a charging device for simultaneously charging a lubricant gun or like apparatus with lubricant and operating fluid under pressure.

Another object is to provide a charging device wherein the lubricant gun or other receiving apparatus must be placed into sealing engagement with the charging nozzle or nozzles before lubricant and operating fluid severally or jointly may be injected thereto.

A further object is to provide a charging device wherein a balanced sealing pressure is maintained as between the lubricant and operating fluid connections of the charger and gun.

Other objects, advantages and uses of the invention, will be apparent after reading the following description and claims and after consideration of the accompanying drawing forming a part of this specification, in which:

Fig. 1 is a side elevation of a lubricant and compressed air charging device constructed in accordance with the invention;

Fig. 2 is an enlarged sectional view of the lubricant feed connection; and,

Fig. 3 is a view similar to Fig. 2 of the air feed connection.

In general, the charging device selected for illustration herein is of the type intended to simultaneously charge the lubricant reservoir A and the compressed air chamber B of an air operated hand portable lubricant gun or similar apparatus and comprises a frame C adapted to be mounted upon any convenient supporting surface D such as a bench or upon the wall of the service station wherein the device is employed, a pressure feed lubricant supply conduit E, and a compressed air supply conduit F secured to the frame C charging nozzles G and H connected to the discharge end of the lubricant and compressed air conduits E and F respectively, cooperating lubricant and air receiving fittings J and K on the lubricant gun for engagement with the nozzles G and H respectively and a manually operable lever L for engaging the remote end of the lubricant gun to urge the gun toward the nozzles G and H with the fittings J and K in registration therewith, to simultaneously provide lubricant and air tight seals therebetween and to open valves M and N in the nozzles G and H respectively.

With reference to Fig. 1 the frame C of the charging device may be constructed as shown of a bracket 2 which may be secured to the supporting surface D by lag screws 3 and a block 4 adapted to be similarly fixed to the surface D rigidly interconnected by a tubular rod or bar 5. The lubricant and compressed air conduits E and F may be fixed at one end upon the bracket 2 and may be connected at their opposite ends in any suitable manner with a lubricant pump and air compressor respectively. The charging nozzles G and H are supported likewise upon the bracket 2 and interconnected with their respective feed conduits E and F. The positioning of the nozzles relative to the bracket 2 and to one another may be determined by the positioning of the fittings J and K upon the lubricant gun or dispenser to be charged or vice versa. The lever L is pivotally mounted at 6 upon the block 4 and may be formed with a portion 7 arranged for engagement with the remote end of the gun so that forward thrust may be applied to the gun upon movement of the lever L toward the bracket 2.

With reference to Fig. 2 the nozzle G comprises a body 8 having a passage 9 therethrough formed with a portion 11 of enlarged diameter at its forward end within which the head 12 of the fitting J may be received. The head 12 is preferably spherical in shape thus providing an annular sealing contact between the spherical surface of the head and the annular mouth 13 of that portion of the passage 9, of normal diameter communicating with the portion of enlarged diameter within which the head 12 is received. The fitting J may be of similar construction to that employed on bearings and other like members for receiving lubricant from a lubricant gun or pump through engagement with the discharge nozzle of the gun or pump therewith. In its present embodiment the fitting J is shown as including a spring pressed check valve 15 for preventing the escape of lubricant through the fitting. The fitting may further include a threaded shank 16 for securing the fitting upon the gun. The valve M of the nozzle G is located within an enlarged portion 17 at the rearward end of the passage 9 and is of the spring pressed ball type having for its seat the mouth of the adjacent portion of normal diameter 3 the bore 9 and serves to prevent flow of lubricant under pressure from the conduit E at all times other than when it is mechanically urged from its seat. A tubular valve operating member 18 is slidably disposed within the passage 9 and arranged to engage the ball of the valve M at its inner end and to project into the fitting receiving portion 11 of the passage at its other end, thus causing the ball valve to be moved away from its seat against the force of its restraining spring when the head 12 of the fitting J is forced against the member 18 as in moving it into engagement with the annular edge 13 defining the discharge orifice of the nozzle. The outer ends of the valve operating member 18 may be of reduced external diameter as shown at 19 and the rearward or inner end of the member formed with slots 21 through its side walls to admit lubricant from the portion 17 of the nozzle passage between the valve ball and adjacent end of the operating member. A stud screw 22 extending through the side wall of the body 8 and into a slot 23 through the side wall of the member 18 serves to prevent dislodgment of the member 18 from within the passage 4. To facilitate the mounting of the nozzles G and H upon the bracket 2 each are provided with externally screw threaded portions 24.

With reference to Fig. 3 the nozzle H comprises a hollow body 25 housing the valve N within its inner end which like the valve M is of the spring pressed ball type, and which remains closed at all such times as when the fitting K is not engaged with the nozzle. The forward end of the body 25 is formed with a chamber 26 communicating with the valve N, within which a sealing washer 27 is disposed. The washer is fixed between the outer end of the body 25 and a bushing 28 secured to the body 25 by cooperating screw threads 29. The fitting K is formed with a forwardly extending elongated tubular portion 31 having openings 32 through its side wall adjacent to the outer end thereof which is adapted to enter the nozzle H through the bushing 28 and sealing washer 27 and to contact and dislodge the valve ball of the nozzle from its seat under thrust applied thereto. Air under pressure from the conduit F may thereupon pass through the valve N and into the fitting K through the openings 32 in the tubular portion 31 of the fitting. The fitting K is further provided with a non-return spring pressed ball valve 33 in its shank portion 34. External screw threads 35 on the shank portion 34 may be provided for securing the fitting to the lubricant gun as shown. A metal guard 36 is supported upon the body of the fitting K concentric with the elongated portion 31 thereof to provide protection against damage to that portion of the fitting as during the handling and use of the gun.

The gun inlet fitting J communicates with the lubricant chamber or reservoir A of the gun and the air inlet fitting K communicates with the compressed air chamber B. In the gun herein illustrated the chambers A and B are separated by a piston 38 slidably mounted upon a tubular member 39 thereby maintaining lubricant in the chamber or reservoir A under pressure by action of the piston 38 under influence of air under pressure in the chamber B. Air under pressure admitted through the fitting K may be conducted to the chamber B through the tubular member 39 as shown. The gun may further include an air operated booster pump generally indicated at 41 and a discharge nozzle 42 connected with the pump 41 by a flexible hose 43.

In operation the charging device may be mounted in a convenient location such as upon a bench or upon a wall near the place where the lubricant gun or dispensing device to be charged is to be used and the conduits E and F connected to suitable sources of supply of lubricant under pressure and compressed air respectively when it becomes necessary to charge the gun or dispenser the operator may first move the lever L away from the bracket 2 and insert the gun between the lever and the bracket in such a manner as to engage the fittings J and K with the nozzles G and H respectively. With the gun thus positioned movement of the lever L toward the bracket 2 will cause the gun to be urged forwardly and to press the fittings J and K tightly into the nozzles G and H as shown in Figs. 2 and 3 respectively. This action results in the opening of the valves M and N of the nozzles whereupon lubricant and compressed air may be simultaneously discharged into the gun. It will be noted that the thrust applied to the gun by action of the line L will be equally distributed between the contacting portions of the lubricant and air connections between the charging device and the gun thus assuring adequate sealing pressure between the fitting J and nozzle G and equal thrust upon the valve balls of the nozzles so as to cause each nozzle to simultaneously open or close upon relieving manual pressure upon the lever L.

It is to be understood that the described embodiments of the invention herein set forth are presented for the purpose of illustration only, and various changes may be made therein without departing from the spirit and scope of the invention.

We claim:

1. In combination, a lubricating gun having a lubricant reservoir and a compressed air reservoir, lubricant and air inlet fittings for said reservoirs respectively, a charging device including a lubricant discharge nozzle and a compressed air discharge nozzle, each of said nozzles having a normally closed valve arranged to open upon engagement under pressure of said fittings with said nozzles respectively, and manually operated means for moving said gun toward said nozzles to establish simultaneous engagement under pressure between said fitting and said nozzles.

2. In combination, a lubricating gun having a lubricant reservoir and a compressed air reservoir, lubricant and air inlet fittings for said reservoirs respectively, a charging device including a lubricant discharge nozzle and a compressed air discharge nozzle, each of said nozzles having a normally closed valve arranged to open upon engagement under pressure of said fittings with said nozzles respectively, and manually operated means for moving said gun toward said nozzles to establish simultaneous engagement under pressure between said fitting and said nozzles, at least one of said inlet fittings having a spherical head adapted to provide substantially universal engagement with its respective nozzle.

3. In combination, a lubricant gun having a charge inlet fitting and a charging device therefor comprising, a supporting frame, a charging nozzle mounted upon said frame and adapted for connection to a fluid charge supply source, said nozzle being adapted to receive said fitting and for engagement with said fitting to form a seal therebetween, and manually operated means for engaging with said gun or dispenser and for applying a thrust thereto to press said fitting into engagement with said nozzle, said inlet fitting having a guard surrounding that part of the fitting engageable with said nozzle.

4. A charging device for lubricant guns or dispensers having, at one end, a pair of charge inlet fittings comprising, a supporting frame, a pair of charging nozzles mounted upon said frame arranged to correspond to the arrangement of said fittings on said gun or dispenser at least one of said nozzles having its fitting engaging portion fashioned to provide universal engagement with the fitting, and means for engaging with and supporting said gun or dispenser and for applying thrust thereto at the opposed end thereof to move said fittings simultaneously into engagement with said nozzles.

5. A charging device for lubricant guns or dispensers having, at one end, a pair of charge inlet fittings comprising, a supporting frame, a pair of charging nozzles mounted upon said frame arranged to correspond to the arrangement of said fittings on said gun or dispenser at least one of said nozzles having its fitting engaging portion fashioned to provide universal engagement with the fitting, means for engaging with and supporting said gun or dispenser and for applying thrust thereto at the opposed end thereof to move said fittings simultaneously into engagement with said nozzles, and means for controlling the flow of charging fluid through said nozzles operable upon engagement of said fittings therewith.

6. A charging device for lubricant guns or dispensers having, at one end, a pair of charge inlet fittings comprising, a supporting frame, a pair of charging nozzles mounted upon said frame arranged to correspond to the arrangement of said fittings on said gun or dispenser at least one of said nozzles having its fitting engaging portion fashioned to provide universal engagement with the fitting, and a hand lever pivotally mounted upon said frame for engaging with and supporting said gun or dispenser and for applying thrust thereto at the opposed end thereof to move said fittings simultaneously into engagement with said nozzles.

7. A charging device for lubricant guns or dispensers having, at one end, a pair of charge inlet fittings comprising, a supporting frame, a pair of charging nozzles mounted upon said frame arranged to correspond to the arrangement of said fittings on said gun or dispenser at least one of said nozzles having its fitting engaging portion fashioned to provide universal engagement with the fitting, means for engaging with and supporting said gun or dispenser and for applying thrust thereto at the opposed end thereof to move said fittings simultaneously into engagement with said nozzles, means for controlling the flow of charging fluid through said nozzles operable upon engagement of said fittings therewith, and valves in said nozzles adapted to open upon engagement between the fittings and their respective nozzles.

8. A charging device for lubricant guns or dispensers having a pair of charge inlet fittings, one of which is formed with a spherical head, comprising a frame, a pair of charging nozzles mounted upon said frame and arranged to correspond to the arrangement of said fittings on said gun or dispenser, one of said nozzles being adapted to cooperate with said spherical headed fitting to provide a substantially universal contact therewith, and manually operable means for engaging with and supporting the remote end of said gun or dispenser and for applying a thrust thereto substantially along the axes of said fittings to press the fittings into engagement with said nozzles, thereby simultaneously to establish sealing engagement between the nozzles and the fittings.

9. A charging device for lubricant guns or dispensers having a pair of charge inlet fittings, comprising a supporting frame, a pair of charging nozzles mounted on said frame arranged to correspond to the arrangement of said fittings on said gun or dispenser, one of said nozzles being arranged to provide for substantially universal engagement with its complementary fitting, and means for engaging with and supporting said gun or dispenser and for applying thrust thereto substantially along the axes of said fittings to move said fittings simultaneously into engagement with said nozzles to establish sealing engagement respectively therebetween.

10. In combination, a lubricating gun having a lubricant reservoir and an actuating fluid reservoir, lubricant and fluid inlet fittings for said reservoirs respectively, a charging device including a lubricant discharge nozzle and a fluid discharge nozzle adapted to engage with said lubricant and fluid inlet fittings respectively, one of said nozzles together with its complementary fitting being formed to provide for substantially universal engagement therebetween, and manually operated means for moving said gun toward said nozzles substantially along the axes of said fittings to simultaneously establish engagement under thrust between said fittings and said nozzles.

ADIEL Y. DODGE.
HARRY R. TEAR.